United States Patent [19]
Vorih et al.

[11] Patent Number: 6,152,104
[45] Date of Patent: Nov. 28, 2000

[54] INTEGRATED LOST MOTION SYSTEM FOR RETARDING AND EGR

[75] Inventors: Joseph M. Vorih, West Suffield, Conn.; Mark A. Israel, Amherst, Mass.

[73] Assignee: Diesel Engine Retarders, Inc., Wilmington, Del.

[21] Appl. No.: 09/196,315

[22] Filed: Nov. 20, 1998

Related U.S. Application Data

[60] Provisional application No. 60/066,702, Nov. 21, 1997.

[51] Int. Cl.[7] ....................................................... F02D 13/04
[52] U.S. Cl. ...................... 123/322; 123/321; 123/568.14
[58] Field of Search ..................................... 123/320, 321, 123/322, 568.14, 90.16

[56] References Cited

U.S. PATENT DOCUMENTS

| | | | |
|---|---|---|---|
| 5,146,890 | 9/1992 | Gobert et al. | 123/321 |
| 5,406,918 | 4/1995 | Joko et al. | 123/321 |
| 5,419,301 | 5/1995 | Schechter | 123/673 |
| 5,485,819 | 1/1996 | Joko et al. | 123/321 |
| 5,537,976 | 7/1996 | Hu | 123/322 |
| 5,609,133 | 3/1997 | Hakansson | 123/90.16 |
| 5,626,116 | 5/1997 | Reedy et al. | 123/321 |
| 5,680,841 | 10/1997 | Hu | 123/322 |
| 5,787,859 | 8/1998 | Meistrick et al. | 123/321 |
| 5,809,964 | 9/1998 | Meistrick et al. | 123/321 |
| 5,816,216 | 10/1998 | Egashira et al. | 123/321 |
| 5,829,397 | 11/1998 | Vorih et al. | 123/90.12 |
| 5,839,453 | 11/1998 | Hu | 123/322 |
| 5,890,469 | 4/1999 | Hakansson et al. | 123/321 |

*Primary Examiner*—Henry C. Yuen
*Assistant Examiner*—Arnold Castro
*Attorney, Agent, or Firm*—David R. Yohannan; Collier Shannon Scott, PLLC

[57] ABSTRACT

A variably timed internal combustion engine valve actuation system and method for opening valves in internal combustion engines. The system functions during both positive power and engine braking, to control the amount of "lost motion" between a valve and a means for opening the valve. In particular, the invention relates to a lost motion engine valve actuation system using a dedicated cam for effecting exhaust valve openings for compression release braking and exhaust gas recirculation ("EGR").

2 Claims, 3 Drawing Sheets

INTEGRATED LOST MOTION SYSTEM FOR RETARDING AND EGR

CROSS REFERENCE TO RELATED APPLICATIONS

This application relates to and claims priority to provisional application serial no. 60/066,702 "INTEGRATED LOST MOTION SYSTEM FOR RETARDING AND EGR" filed on Nov. 21, 1997.

FIELD OF THE INVENTION

The present invention relates generally to variably timed internal combustion engine valve actuation systems and methods for opening valves in internal combustion engines. More specifically the invention relates to systems and methods, used both during positive power and engine braking, for controlling the amount of "lost motion" between a valve and a means for opening the valve. In particular, the invention relates to a lost motion engine valve actuation system using a dedicated cam for effecting valve openings for compression release braking and exhaust gas recirculation ("EGR").

BACKGROUND OF THE INVENTION

Compression release-type engine braking or retarder systems are well-known in the art. Engine retarders temporarily convert an internal combustion engine of the compression ignition type into an air compressor in order to slow the engine. A compression release retarder decreases the kinetic energy of an engine by opposing the upward motion of the engine's pistons on the compression stroke. As a piston travels upward on its compression upstroke, the gases that are trapped in the cylinder are compressed. The compressed gases oppose the upward motion of the piston. When the piston nears the top of its stroke, an exhaust valve is opened to release the compressed gasses. After the pressure has been released from the cylinder, the piston cannot recapture the energy stored in the compressed gases on the subsequent expansion downstroke.

The braking system provides the operator with increased control over the vehicle. Properly designed and adjusted compression release-type engine retarders can generate retarding power equal in magnitude to a substantial portion of the power generated during positive power operations. Compression release-type retarders of this type supplement the braking capacity of the primary vehicle wheel braking system. Engine retarders may substantially extend the life of the primary wheel braking system of the vehicle.

The hydraulic valve control systems of compression release engine retarders have a number of components. A solenoid valve is typically provided to control the supply of engine oil to the hydraulic circuit of the compression release engine retarder. A master piston engages the hydraulic valve control system, typically at a rocker arm or cam. The master piston is linked to a slave piston through a hydraulic circuit. The slave piston is connected to an exhaust valve of the engine. When the compression release retarder is actuated, the rocker arm or cam lobe pushes against the master piston. The motion of the master piston is transferred to the slave piston through the hydraulic circuit, causing the slave piston to actuate and open the exhaust valve at a point near the end of the compression stroke.

Much of the potential energy created by compressing the gas in the cylinder is not recovered during the subsequent expansion or power stroke of the engine. Instead, it is dissipated through the exhaust and radiator systems of the engine. By dissipating the energy developed by compressing the cylinder charge, the compression release-type retarder slows the vehicle down.

The effectiveness of engine braking can be improved through the use of EGR. The exhaust gas may be recirculated into the cylinder at the time when the cylinder's piston is at or near Bottom Dead Center (BDC) at the beginning of the normal compression stroke. EGR allows a greater volume of air to be admitted to the cylinder. Consequently, the engine works harder compressing the denser air volume, and superior braking is achieved. EGR may also be employed during normal positive power operation. The benefits derived from positive power EGR are primarily reduced exhaust gas emissions.

Engine braking and EGR operations require that the cylinder exhaust valve be opened at times other than normal positive power openings. Engine braking requires the exhaust valves to be opened at or near Top Dead Center (TDC) at the completion of a cylinder's compression strike; EGR at or near Bottom Dead Center (BDC) at the beginning of the compression stroke. A typical engine's exhaust valve opening system holds the exhaust valve closed at these times.

An engine may include a retarding EGR event, a positive power EGR event, or both. These events maybe implemented as additional lobes on a cylinder's exhaust valve cam. A separate add-on system has been proposed to be mounted to the engine significantly increasing the externally installed dimensions. In addition, the exhaust valve cam may include a compression release brake lobe, as well as the main exhaust event lobe. Limited space on the exhaust valve cam may make it difficult to include lobes for retarding EGR and positive power EGR events, along with lobes for compression release braking and the main exhaust event. The valve lift profiles for the main exhaust event and the positive EGR event may overlap. Overlapping is undesirable because it may limit the engine's capability to achieve all of the desired events. As a result, there is a need to provide a valve actuation system which can accommodate multiple engine valve events.

Current valve actuation systems possess other deficiencies as well. In many internal combustion engines, the engine cylinder intake and exhaust valves are opened and closed by fixed profile cams, and more specifically, by one or more fixed lobes which are an integral part of each of the cams. The use of fixed profile cams makes it difficult to make the necessary adjustments to the timing and/or amount of engine valve lift for various engine operating conditions, such as different engine speeds.

One method of adjusting valve timing and lift has been to incorporate a "lost motion" device in the linkage between the valve and the cam. Lost motion is the term applied to a class of technical solutions for modifying the valve motion proscribed by a cam profile with a variable length mechanical, hydraulic, or other linkage means. A cam lobe provides the maximum (longest dwell and greatest lift) motion needed over a full range of engine operating conditions. In a lost motion system, a variable length system is included in the valve train linkage to subtract or lose part or all of the motion imparted by the cam to the valve.

This variable length system may, when expanded fully, transmit all of the cam motion to the valve, and when contracted fully, transmit none or a minimum amount of the cam motion to the valve. An example of such a system and method is provided in Hu, U.S. Pat. Nos. 5,537,976 and 5,680,841, which are assigned to the same assignee as the present application, and which are incorporated herein by reference.

In the lost motion system of U.S. Pat. No. 5,680,841 (the "'841 patent"), an engine cam shaft actuates a master piston which displaces fluid from its hydraulic chamber into a hydraulic chamber of a slave piston. The slave piston in turn acts on the engine valve to open it. The lost motion system may be a solenoid valve and a check valve in communication with the hydraulic circuit including the chambers of the master and slave pistons. The solenoid valve may be maintained in a closed position in order to retain hydraulic fluid in the circuit. As long as the solenoid valve remains closed, the slave piston and the engine valve respond directly to the motion of the master piston, which in turn displaces hydraulic fluid in direct response to the motion of a cam. When the solenoid is opened temporarily, the circuit may partially drain, and part or all of the hydraulic pressure generated by the master piston may be absorbed by the circuit rather than be applied to displace the slave piston.

Prior lost motion systems have typically not utilized high speed mechanisms capable of rapidly varying the length of the lost motion system. These lost motion systems have not been capable of assuming more than one length during a single cam lobe motion, or even during one cycle of the engine. The use of a high speed mechanism to vary the length of the lost motion system allows for more precise control over valve actuation, and accordingly optimal valve actuation may be attained for a wide range of engine operating conditions.

As discussed above, engine efficiency and performance may be maximized through the use of variably timed positive and negative power EGR events. Similarly, braking performance may be enhanced through two-cycle braking. A lost motion system may be used to implement these operations. In a lost motion system, working fluid is drained and added at precise times to the hydraulic link between the master piston and slave piston. The engine valve profile may be modified by modifying the motion of the master piston, which follows a cam, prior to its transfer to the slave piston. In this way, variable timing is achieved. Variable timed positive and negative power EGR, as well as two-cycle braking, may be difficult to achieve on an exhaust valve cam already crowded with a main exhaust event lobe and a compression release brake event lobe because of inadequate base circle "residence time." Residence time refers to the amount of time at which the cam presents a zero lift profile to the cam follower or master piston. This time is generally proportional to the amount of space on the cam not taken up by different lobes.

An example of a lost motion system and method used to obtain retarding and exhaust gas recirculation is provided by the Gobert, U.S. Pat. No. 5,146,890 (Sept. 15, 1992) for a Method And A Device For Engine Braking A Four Stroke Internal Combustion Engine, assigned to AB Volvo, and incorporated herein by reference. Gobert discloses a method of conducting exhaust gas recirculation by placing the cylinder in communication with the exhaust system during the first part of the compression stroke and optionally also during the latter part of the inlet stroke. Gobert uses a lost motion system to enable and disable retarding and exhaust gas recirculation, but such system is not variable within an engine cycle.

The '841 patent discloses an internal combustion engine with valves that are opened by cams cooperating with hydraulic circuits that are partly controlled by electrically operated hydraulic fluid valves. The system of the '841 patent is limited by inadequate residence time since its system includes the use of a single cam for controlling all openings of the engine valve regardless of the engine's mode of operation.

As a result of the shortcomings of existing engine valve actuation systems. There is a need for a system which may accommodate all valve events necessary for efficient engine operation, including EGR, compression release braking and positive power operations.

OBJECTS OF THE INVENTION

It is therefore an object of the present invention to provide an integrated lost motion and variable timing valve actuation system.

It is an additional object of the present invention to provide a method and apparatus to control emissions by recirculating exhaust gas to the engine cylinders.

It is another object of the present invention to provide variable exhaust gas recirculation capability in an add-on system without adding externally installed dimensions.

It is therefore an object of the present invention to provide a method and apparatus to recirculate exhaust gas during compression release braking.

It is another object of the present invention to provide a method and apparatus to recirculate exhaust gas during positive power.

It is another object of the present invention to provide use of dedicated cam to implement positive and negative power exhaust gas recirculation with lost motion.

It is yet another object of the present invention to provide a method and apparatus to optimize the timing of the exhaust gas recirculation event for positive power operation.

It is yet another object of the present invention to provide a method and apparatus to optimize the magnitude of the exhaust gas recirculation event for positive power operation.

It is yet another object of the present invention to provide a method and apparatus to optimize the timing of the exhaust gas recirculation event for compression release braking operation.

It is yet another object of the present invention to provide a method and apparatus to optimize the magnitude of the exhaust gas recirculation event for compression release braking operation.

It is yet another object of the present invention to provide a method and apparatus to achieve improved retarding performance.

It is yet another object of the present invention to provide a method and apparatus to achieve increased retarding power.

It is yet another object of the present invention to provide a method and apparatus to optimize the operation of the compression release retarder at operating speeds other than the rated speed of the engine.

It is yet another object of the present invention to provide a method and apparatus to optimize the operation of the compression release retarder at speeds other than the speed at which the compression release retarder is set at installation.

It is another object of the present invention to provide two-cycle braking.

Additional objects and advantages of the invention are set forth, in part, in the description which follows and, in part, will be apparent to one of ordinary skill in the art from the description and/or from the practice of the invention.

SUMMARY OF THE INVENTION

In response to this challenge, Applicants have developed an innovative, economical internal combustion engine comprising: an engine cylinder exhaust valve which is selectively openable and closable; a cam having a plurality of lobes synchronized with openings of the engine cylinder exhaust valve for exhaust gas recirculation and engine braking events; a hydraulic linkage containing hydraulic fluid operatively coupled between the cam and the engine cylinder exhaust valve for selectively responding to the lobes by causing the valve to open; and a means for controlling the hydraulic fluid pressure in the hydraulic fluid linkage to selectively modify the openings of the engine cylinder valve in response to the lobes, wherein the means for controlling the hydraulic fluid pressure is capable of maintaining the engine cylinder valve completely closed in response to a first one of the lobes and open in response to a second one of the lobes, each of the plurality of lobes being selectable at various times to be either the first one or the second one of the lobes.

The means for controlling the hydraulic fluid pressure may comprise a control valve for selectively releasing hydraulic fluid from the hydraulic linkage. The control valve may be an electrically operated valve controlled by electronic circuitry that includes a microprocessor. The engine may also include a supply of hydraulic fluid and a check valve for allowing the hydraulic fluid to flow from the supply into the hydraulic linkage but not in an opposite direction. The supply of hydraulic fluid may comprise an accumulator. The means for controlling the hydraulic fluid pressure may comprise an electrically operated valve for selectively releasing hydraulic fluid from the hydraulic linkage to the accumulator. The hydraulic linkage may comprise: a master piston that reciprocates in response to the lobes; and a slave piston that selectively reciprocates in response to hydraulic fluid pressure and flow in the hydraulic linkage in order to selectively open the engine cylinder exhaust valve. The hydraulic linkage may be disposed in a rocker arm which rocks in response to the lobes. The engine may include a slave piston disposed in the rocker arm, the slave piston being reciprocable relative to the rocker arm in response to hydraulic fluid pressure and flow in the hydraulic linkage in order to selectively open the engine cylinder valve.

In alternative embodiment, the present invention may comprise an internal combustion engine capable of operating in power and braking modes and providing for exhaust gas recirculation in either mode comprising: an engine piston reciprocally mounted within a cylinder for cyclical successive compression and expansion strokes; an exhaust valve operable to open near the end of an expansion stroke of the engine piston when the engine is operated in a power mode and operable to open in a variable timed relationship to the engine piston compression stroke when the engine is operated in the braking mode; a first exhaust valve actuating means for imparting reciprocable movement to the exhaust valve when the engine is operated in the power mode; and a second exhaust valve actuating means for imparting reciprocable movement to the exhaust valve when the engine is operated in the braking mode and when exhaust gas recirculation is required. The second exhaust valve actuating means may comprise: a second cam having a plurality of lobes synchronized with openings of the engine cylinder exhaust valve for engine braking events and for exhaust gas recirculation; a second hydraulic linkage containing hydraulic fluid operatively coupled between the second cam and the engine cylinder exhaust valve for selectively responding to the lobes by causing the valve to open. The engine may also include a means for controlling the hydraulic fluid pressure in the second hydraulic fluid linkage to selectively modify the openings of the engine cylinder valve in response to the lobes, wherein the means for controlling the hydraulic fluid pressure is capable of maintaining the engine cylinder valve completely closed in response to a lobe. The first valve actuating means may comprise: a first cam having a lobe synchronized with openings of the engine cylinder exhaust valve for power events; a first hydraulic linkage containing hydraulic fluid operatively coupled between the cam and the engine cylinder exhaust valve for selectively responding to the lobes by causing the valve to open. The first hydraulic linkage may be disposed in a rocker arm which rocks in response to the lobes. The engine may further include a slave piston disposed in the rocker arm, the slave piston being reciprocable movable relative to the rocker arm in response to hydraulic fluid pressure and flow in the first hydraulic linkage in order to selectively open the engine cylinder exhaust valve. The engine may also include a means for controlling the hydraulic fluid pressure in the first hydraulic fluid linkage to selectively reduce the pressure in the linkage so that the exhaust valve will not open in response to motion of the rocker arm.

Another embodiment of the present invention may be an internal combustion engine capable of operating in a power mode or a braking mode comprising: an engine piston reciprocally mounted within a cylinder for cyclical successive compression and expansion strokes; an exhaust valve operable to open near the end of an expansion stroke of the engine piston when the engine is operated in a power mode and operable to open in a variable timed relationship to the engine piston compression stroke when the engine is operated in the braking mode; a first exhaust valve actuating means for opening the exhaust valve when the engine is operated in the power mode; a second exhaust valve actuating means for opening the exhaust valve when the engine is operated in the braking mode; wherein the second exhaust valve actuating means opens the exhaust valve for engine gas recirculation. The second exhaust valve actuating means is independent form the first exhaust valve actuating means.

It is to be understood that both the foregoing general description and the following detailed description are exemplary and explanatory only, and are not restrictive of the invention as claimed. The accompanying drawings, which are incorporated herein by reference, and which constitute a part of the specification, illustrate certain embodiments of the invention, and together with the detailed description serve to explain the principles of the present invention.

DETAILED DESCRIPTION OF THE INVENTION

Figure 1:
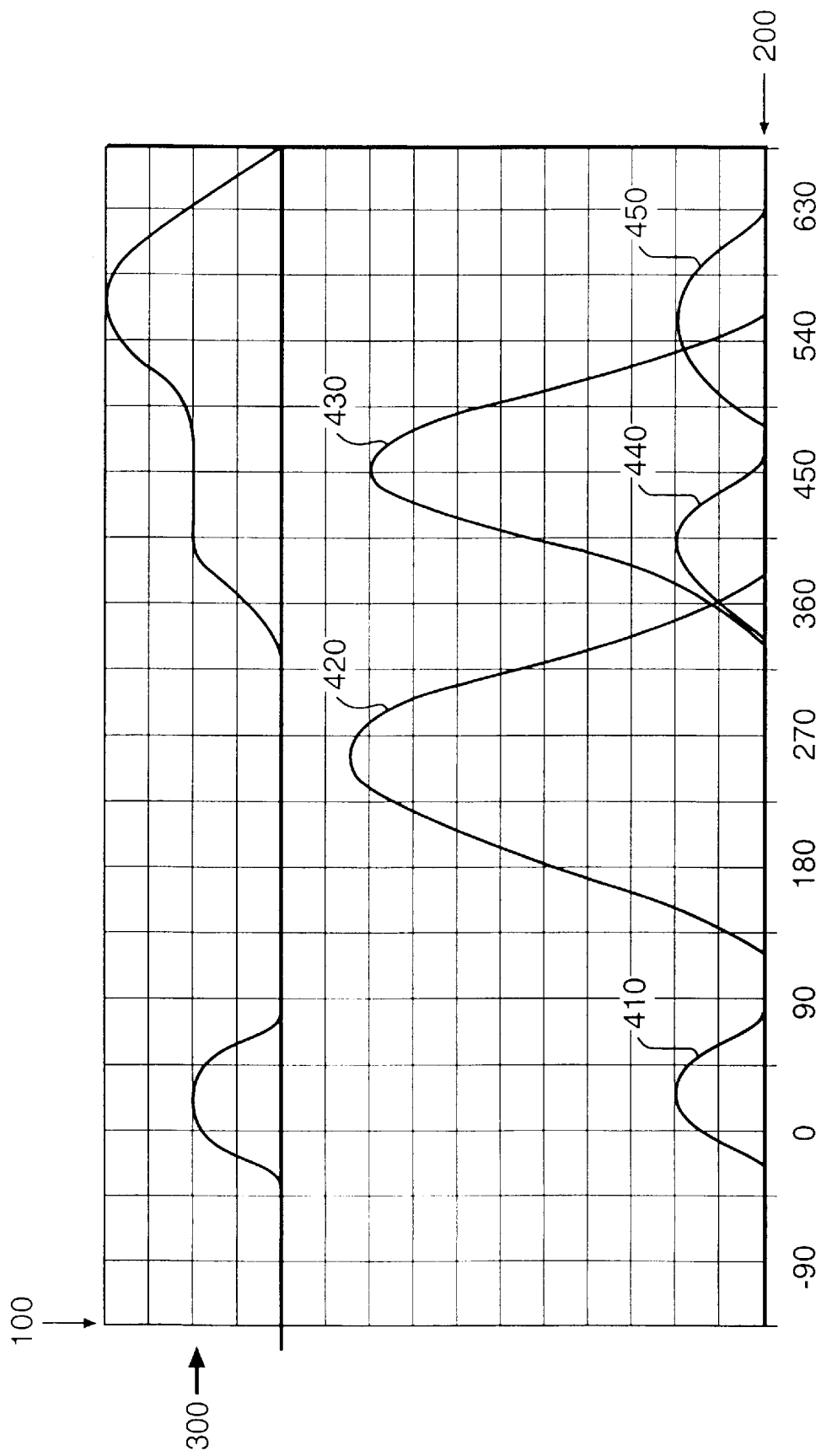
FIG. 1 is a graph showing valve lift profiles for the intake valve event and for various exhaust valve events, as well as the unmodified braking and EGR cam profile.

The invention is first described with reference to FIG. 1. FIG. 1 discloses a graph of valve lift profiles for the intake and exhaust valves of an engine cylinder versus camshaft crank angle. The magnitude of the valve lift is shown on the vertical axis 100. The degree of rotation of the crank shaft is shown on the horizontal axis 200. The cam lobe profile for a dedicated cam according to the present invention is shown by curve 300 on the upper portion of the graph. Curve 300 represents a cam profile for a dedicated exhaust valve cam that carries a compression relief brake lobe, a positive EGR lobe (doubles as a second brake lobe), and a negative EGR lobe. The main exhaust event cam lobes and main intake event cam lobes are carried on separate cams. By implementing the EGR and braking event lobes on a dedicated cam separate from the main exhaust event cam it is possible to achieve positive power EGR with improved functionality as well as optimize compression relief braking. Attempting to implement a positive power EGR on a standard exhaust cam would likely result in an overlap of the positive power EGR and main exhaust lobes. In the present invention, the positive power EGR event does not overlap the compression relief braking and negative power EGR events. The valve events that would be combined on the dedicated cam are the compression relief braking event 410, the positive power EGR event 440, and the negative power EGR event 450. The main exhaust event 420 and the main intake event 430 would be driven off separate cams. As can be seen by the curves, the positive power EGR event 440 and the main exhaust event 420 overlap.

In the present invention, two cycle braking may be implemented by employing the same lobe used for positive power EGR. A hydraulic lifter may be used to reduce the main exhaust event 420 in order to effect and achieve two cycle braking. Reducing the main exhaust event is necessary in order to transform the exhaust stroke of the engine into a second compression stroke. Each event would be used to get Brake Gas Recirculation (BGR) for the second brake event. The embodiment of the invention which employs the hydraulic lifter is shown in FIG. 3.

Figure 2:
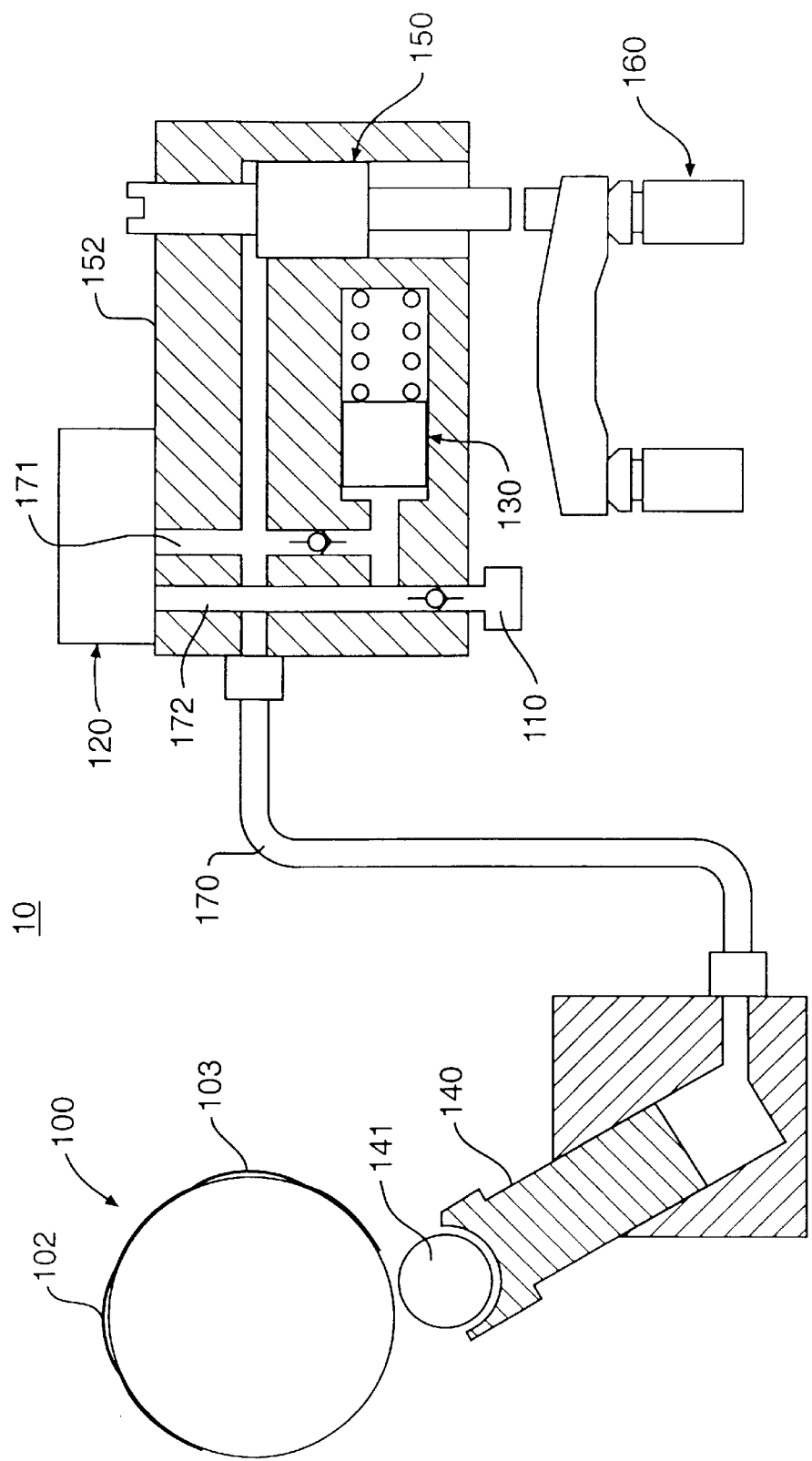
FIG. 2 is a schematic cross-sectional view showing an embodiment of the invention.

A valve actuation system 10 according to the present invention is shown in FIG. 2. This system includes a dedicated cam 100 with lobes for a compression relief braking event 102 and an EGR event 103. The lobes drive a master piston 140. The present invention includes a cam with at least one compression relief braking lobe, but may encompass many different cam configurations including that shown in FIG. 1. The master piston moves in response to a cam follower 141. Any cam follower configuration, such as an oscillating follower, a flat follower, or roller follower, as shown in FIG. 2, may be used. As shown, the master piston 140 is connected to a slave piston 150 by a master slave hydraulic circuit. It is within the scope of the invention to employ a separate rocker arm in place of a hydraulic link. The circuit includes a high pressure passage 170 connecting the master piston 140 to the slave piston 150. The slave piston is enclosed within a housing 152. In alternative embodiments of the invention, the passageways shown in FIG. 2 may be embodied in external tubing. Slave piston 150 moves to actuate the exhaust valves 160. A high speed, two-way solenoid valve 120 is provided to control the pressure in the hydraulic circuit 170. Working hydraulic fluid may be supplied from the engine lube oil system 110. The system may further include an accumulator 130 in order to provide an expansion volume for pressurized hydraulic fluid.

The present invention provides for "lost motion." Valve 120 may be controlled to delete or vary valve events as required. For example, when it is necessary to delete a valve event, valve 120 strokes to connect hydraulic passages 171 and 172 allowing a pressurized fluid in circuit 170 to drain to the accumulator 130. When master piston 140 strokes the motion is not transferred to the slave piston 150. The motion is absorbed by accumulator 130. The exhaust valves 160 do not lift. The control signals for the valve 120 may be provided by electronic circuitry that may include a microprocessor.

Figure 3:
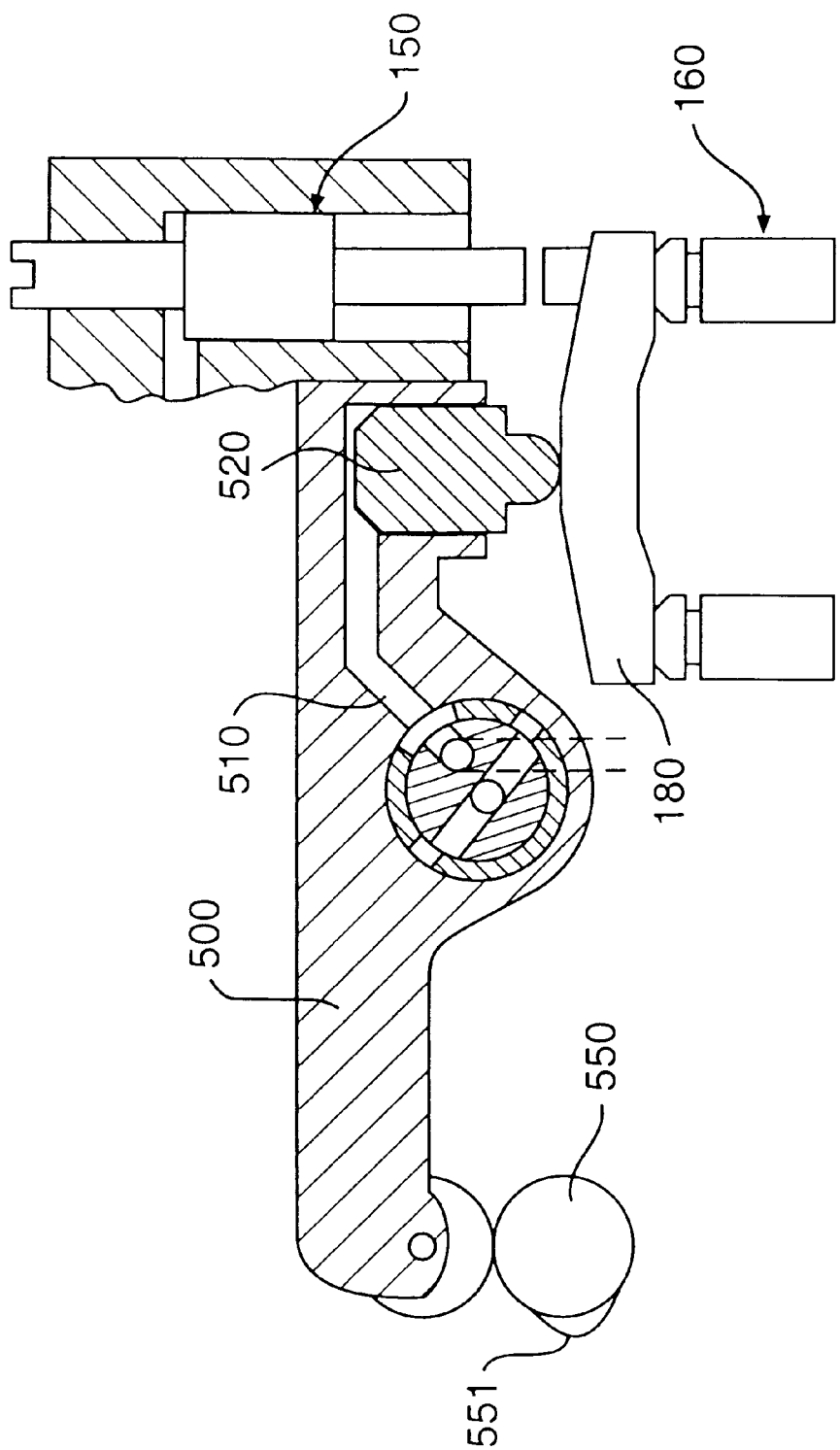
FIG. 3 is a schematic cross-sectional view showing an embodiment of the invention having a hydraulic lifter for disabling the main exhaust event.

Referring next to FIG. 3, the system according to the present invention may also include a hydraulic lifter in order to disable the main exhaust event. A hydraulic lifter may be used to disable the main exhaust event in achieving two-cycle braking. Disabling the main exhaust event is necessary to transferring the exhaust stroke of engine into a second compression stroke.

Referring to FIG. 3, camshaft 550 includes a main exhaust event lobe 551 that imparts motion to rocker arm 500. Hydraulic lifter member 520 in rocker arm 500 acts on exhaust bridge 180 to actuate exhaust valves 160 to effect the main exhaust event. Hydraulic fluid in passage 510 may be drained and refilled as necessary to disable and enable the main exhaust event, or portions of the main exhaust event, as desired. Slave piston 150 actuates exhaust valves 160 via the dedicated camshaft circuit shown in FIG. 2, as discussed above.

It will be apparent to those skilled in the art that various modifications and variations can be made in the construction and configuration of the present invention without departing from the scope or spirit of the invention. Various modifications and variations can be made in the construction of the valve actuation system without departing from the scope or spirit of the invention's use of a dedicated cam. For example, the displacement of the cam lobe may transferred to the engine valve by means of a rocker arm or hydraulic circuit. Further, it may be appropriate to make additional modifications, such as different arrangements of valve rockers, push tubes, cam followers etc., to form the valve actuation train. Thus, it is intended that the present invention cover the modifications and variations of the invention provided they come within the scope of the appended claims and their equivalent.

What is claimed is:

1. An internal combustion engine having at least a positive power operating mode and an engine braking operating mode, said engine comprising:

at least one engine cylinder exhaust valve, said at least one engine cylinder exhaust valve being selectively operated between an open position and a closed position;

a cam assembly having a plurality of lobes thereon, wherein said plurality of lobes permit the selective opening of said at least one engine cylinder exhaust valve during the positive power operating mode and the engine braking mode;

a linkage assembly operatively coupled between said cam and said at least one engine cylinder exhaust valve for selectively responding to said plurality of lobes to selectively open said at least one exhaust valve; and control means for controlling said linkage assembly to selectively modify the openings of said engine cylinder valve in response to said plurality of lobes, wherein said control means is operates said linkage assembly to selectively operate said exhaust valve to produce at least one exhaust gas recirculation event during the positive power operating mode and at least one exhaust gas recirculation event during the engine braking operating mode, wherein said linkage assembly is a lost motion linkage assembly.

2. The engine according to claim 1, wherein said linkage assembly is disposed within a rocker arm assembly positioned between said cam and said at least one engine cylinder exhaust valve.

* * * * *